United States Patent [19]
North et al.

[11] Patent Number: 5,670,859
[45] Date of Patent: Sep. 23, 1997

[54] FEEDBACK CONTROL OF AN INVERTER OUTPUT BRIDGE AND MOTOR SYSTEM

[75] Inventors: Michael John North; Christopher Hall; Thomas Mark Cyster, all of Taipei; Ching-Chuan Chen, Keelung, all of Taiwan

[73] Assignee: General Resource Corporation, Taipei, Taiwan

[21] Appl. No.: 494,583

[22] Filed: Jun. 23, 1995

[51] Int. Cl.$^6$ .................................................. H02P 3/18
[52] U.S. Cl. ................................ 318/801; 318/254
[58] Field of Search ........................... 318/254, 138, 318/439, 807–811, 801–803; 363/34, 36, 37, 40, 41

[56] References Cited

U.S. PATENT DOCUMENTS

| | | | |
|---|---|---|---|
| 4,016,368 | 4/1977 | Onoda et al. | 318/723 |
| 4,663,578 | 5/1987 | Iwasaki et al. | 318/762 |
| 4,910,450 | 3/1990 | Parker et al. | 318/811 |
| 4,959,602 | 9/1990 | Scott et al. | 318/803 |
| 5,006,777 | 4/1991 | Lagree | 318/798 |
| 5,038,092 | 8/1991 | Asano et al. | 318/811 |
| 5,053,690 | 10/1991 | Mutoh et al. | 318/811 |
| 5,123,746 | 6/1992 | Okado | 363/37 |
| 5,206,575 | 4/1993 | Nakamura et al. | 318/807 |
| 5,208,524 | 5/1993 | Kono et al. | 318/727 |
| 5,241,257 | 8/1993 | Nordby et al. | 318/811 |
| 5,258,904 | 11/1993 | de Benito et al. | 363/41 |
| 5,264,773 | 11/1993 | Koyama et al. | 318/798 |
| 5,274,317 | 12/1993 | Utley et al. | 318/802 |
| 5,298,847 | 3/1994 | Kerkman et al. | 318/800 |
| 5,309,075 | 5/1994 | Yokoe et al. | 318/608 |
| 5,317,248 | 5/1994 | Utley et al. | 318/811 |
| 5,373,195 | 12/1994 | De Doncker et al. | 307/45 |
| 5,428,522 | 6/1995 | Millner et al. | 363/63 |
| 5,446,365 | 8/1995 | Nomura et al. | 320/14 |

*Primary Examiner*—Brian Sircus
*Attorney, Agent, or Firm*—George O. Saile; Larry J. Prescott

[57] ABSTRACT

This invention provides a means to maintain the rotational speed and the relationship of the electromagnetic fields of a three phase induction motor and to determine the minimum voltage to excite the motor without it stalling. The three phase induction motor is driven by an inverter bridge circuit which converts DC input power into three phase AC output power. Feedback of the current provided to the inverter bridge circuit is split into positive and negative current flow periods which are used to determine appropriate changes to the three phase AC power magnitudes and phase angles. The inverter bridge circuit uses six insulated gate bipolar transistors to control the three phase AC power magnitude and phase angles.

17 Claims, 7 Drawing Sheets

FEEDBACK CONTROL OF AN INVERTER OUTPUT BRIDGE AND MOTOR SYSTEM

BACKGROUND OF THE INVENTION

(1) FIELD OF THE INVENTION

This invention relates to using the current supplied to an inverter bridge circuit supplying power to a three phase induction motor as the feedback mechanism for providing motor speed stability and minimizing motor power consumption.

The invention only relates to feedback occuring at speeds at or near that of the pulse width modulation frequency.

The invention does not exclude other forms of feedback to be used in conjunction with this feedback. For example, one embodiment includes a peak detector on the motoring current.

(2) DESCRIPTION OF THE RELATED ART

Control of induction motors using pulse width modulated inverters are described in U.S. Pat. No. 5,208,524 to Kono et al, U.S. Pat. No. 5,053,690 to Mutoh et al, U.S. Pat. No. 5,317,248 to Utley et al, U.S. Pat. No. 5,309,075 to Yokoe et al, U.S. Pat. No. 5,298,847 to Kerkman et al, U.S. Pat. No. 5,274,317 to Utley et al, and U.S. Pat. No. 5,264,773 to Koyama et al.

The feedback control mechanism of this invention is unique in that it does not attempt to measure the integral of the current with time, or charge, or separately the positive and negative flow of charge into the inverter over a small integral number of pulse width modulation periods, usually one pulse width modulation period. The invention merely measures the period of time when there is a positive current and the period of time when there is a negative current supplied to the inverter over and integral number of pulse width modulation periods.

SUMMARY OF THE INVENTION

It is a principle objective of this invention to provide a feedback control mechanism for an inverter bridge circuit connected to an induction motor which can stabilize the motor speed and minimize speed oscillations.

It is a further object of this invention to minimize the power delivered to the induction motor by the inverter bridge circuit.

These objectives are to be achieved while minimizing the cost of implementation and maximizing the speed of feedback.

These objectives are achieved by means of feedback of the time current flows into and the time current flows out of an inverter bridge circuit which is connected to an induction motor, usually a three phase induction motor.

This invention uses a Direct Current Current Transformer, DCCT, to measure the current which flows out of the inverter bridge circuit. The DCCT produced a voltage which is proportional to the current. This voltage is amplified and fed into two comparitors. One comparitor produces a logical true if the voltage, and thus the current, is positive. The other comparitor produces a logical true if the voltage, and thus the current is negative. These comparitor outputs are timed and these time values, plus their derivatives and integrals, are used to control the induction motor.

The implementation cost is low since only a minimal amount of information is required to achieve the objectives and the required information is easy to measure. The feedback method used converts to a digital signal as soon as possible which helps keep the cost low and the speed of feedback high.

The inverter bridge circuit converts a direct current input into an alternating current output. Usually the alternating current output is a three phase output but the invention will also work with single phase alternating current output or other number of phases of alternating current output.

DESCRIPTION OF THE PREFERRED EMBODIMENTS

Figure 1:
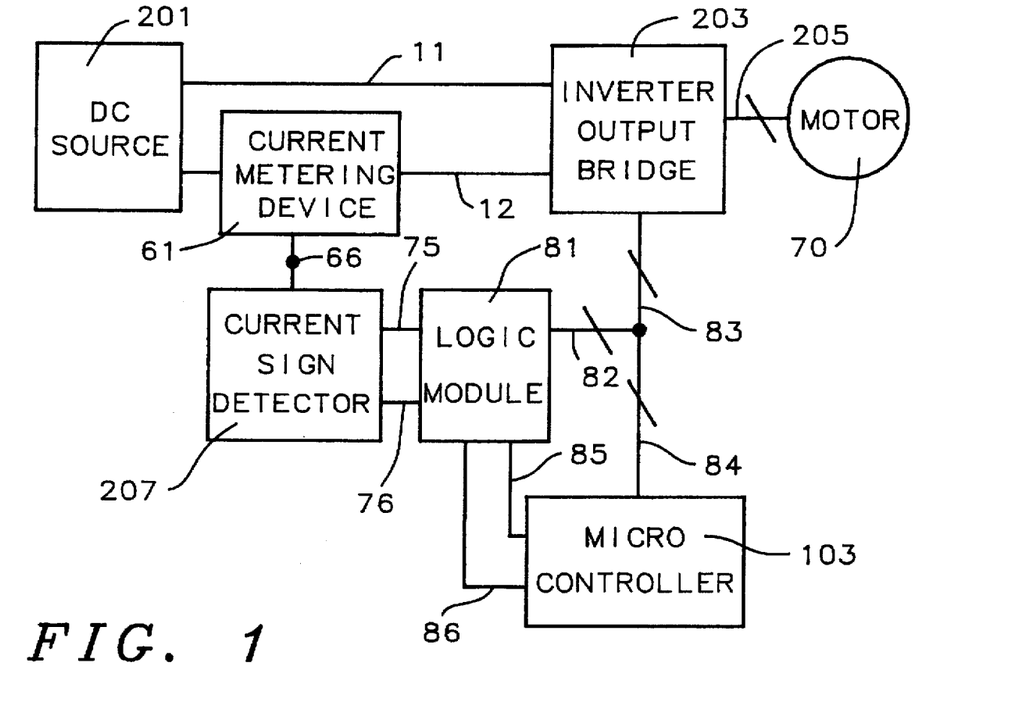
FIG. 1 shows a block diagram of a DC power source feeding an inverter output bridge controlled by the inverter feedback mechanism.

Refer now to FIG. 1, there is shown a block diagram of the preferred embodiment of this invention. Direct current, or DC, power is produced by a DC source 201 and delivered to an inverter output bridge circuit 203 where it is converted to an alternating current, or AC, controllable power source. The DC power is delivered to the inverter output bridge circuit 203 by a positive DC link 11 and a negative DC link 12. An induction motor 70 is connected to the AC output of the inverter output bridge circuit 203 by means of an output power bus 205. The term bus in this description represents a number of connecting paths from one block of the block diagram to another block of the block diagram. The output power bus 205 will have the appropriate number of cables for the type AC power used, for example three cables for three phase AC power output or two cables for single phase AC power output. The inverter output bridge circuit has a number of control terminals connected to a inverter output bridge control bus 83.

A current metering device 61 is connected in series with the negative DC link 12. Current in the positive DC link 11 and the negative DC link 12 is positive when flowing from the DC source 201 to the inverter output bridge 203 in the positive DC link 11 and from the inverter output bridge 203 to the DC source 201 in the negative DC link 12. Current can be measured in either the positive DC link 11 or the negative DC link 12. Current can also be measured on one of the cables of the output power bus 205 but more logic will then be required adding to both cost and circuit delay.

The current metering device has an output terminal and is a Direct Current Current Transformer where the voltage at the output terminal 66 is proportional to the current in the positive DC link 11 or the negative DC link 12. The output of the Direct Current Current Transformer 61, or DCCT, is fed to a current sign detector 207. The current sign detector 207 has a first output 75 and a second output 76. The current sign detector produces a logic signal, $I_p$, having a first logic value, such as a logical one, only during the time the current in the positive DC link or negative DC link is positive at the first output 75 and a logic signal, $I_n$, having a first logic value, such as a logical one, only during the time the current in the positive DC link or negative DC link is negative at the second output 76. When either the logic signal $I_p$ or the logic signal $I_n$ does not have the first logic value they have a second logic value, such as a logical zero.

The two logic signals, $I_p$ and $I_n$, are then fed to a logic stage located in a logic module 81 which has control inputs connected to a logic module control bus 82. The logic module control bus 82 is connected to the inverter output bridge control bus 83. The logic stage then gates the logic signals, $I_p$ and $I_n$, with some Boolean Logic of the inverter output bridge control signals to improve the relationship of the feedback with the motor state. The logic stage produces re-formatted logic signals, re-formatted $I_p$ at a first output 85 and a re-formatted $I_n$ at a second output 86, of the logic module 81. The re-formatted $I_p$ and $I_n$ also have logic levels which indicate whether the current in the positive DC link and the negative DC link are positive or negative. The first output 85 and the second output 86 of the logic module are then fed to the count enable inputs of a first timer and a second timer of a micro-controller 103, since micro-controllers normally have timers available. Most micro-controller timers have count enable inputs however the function can also be accomplished using software. The micro-controller 103 has control outputs connected to a micro-controller control bus 84 which is connected to the inverter output bridge control bus 83 and the logic module control bus 82. The micro-controller control outputs modify the control signals to the inverter output bridge so as to vary the frequency and/or magnitude of the AC power delivered to the induction motor 70. Usually three phase AC power is used but single phase AC power or AC power having another number of phases can also be used.

Figure 2:
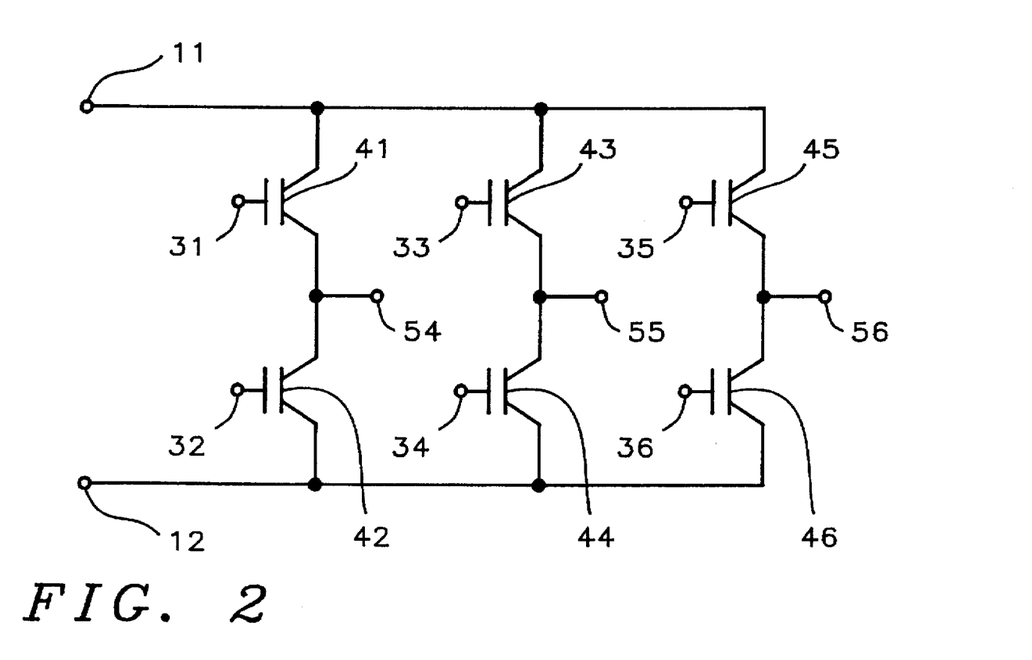
FIG. 2 is a schematic diagram of the inverter output bridge circuit.

Refer now to FIG. 2, there is shown an inverter output bridge circuit for three phase AC power comprising six switching elements, usually Insulated Gate Bipolar Transistors, IGBT, 41, 42, 43, 44, 45, and 46. A switch pair controls the effective applied voltage at each AC power output terminals 54, 55, and 56 which are connected to the motor input terminals. Switch pair SW1 41 and SW2 42 control the effective applied voltage at the U phase 54, switch pair SW3 43 and SW4 44 control the effective applied voltage at the V phase 55, and switch pair SW5 45 and SW6 46 control the effective applied voltage at the W phase 56. The effective applied voltage is controlled by the ratio of time the top and bottom switch of a pair are on, both switches of a pair can not be on simultaneously. A conduction mode exists when at least one of SW1 41, SW3 43, or SW5 45 is on and at least one of SW2 42, SW4 44, or SW6 46 is on.

Figure 3:
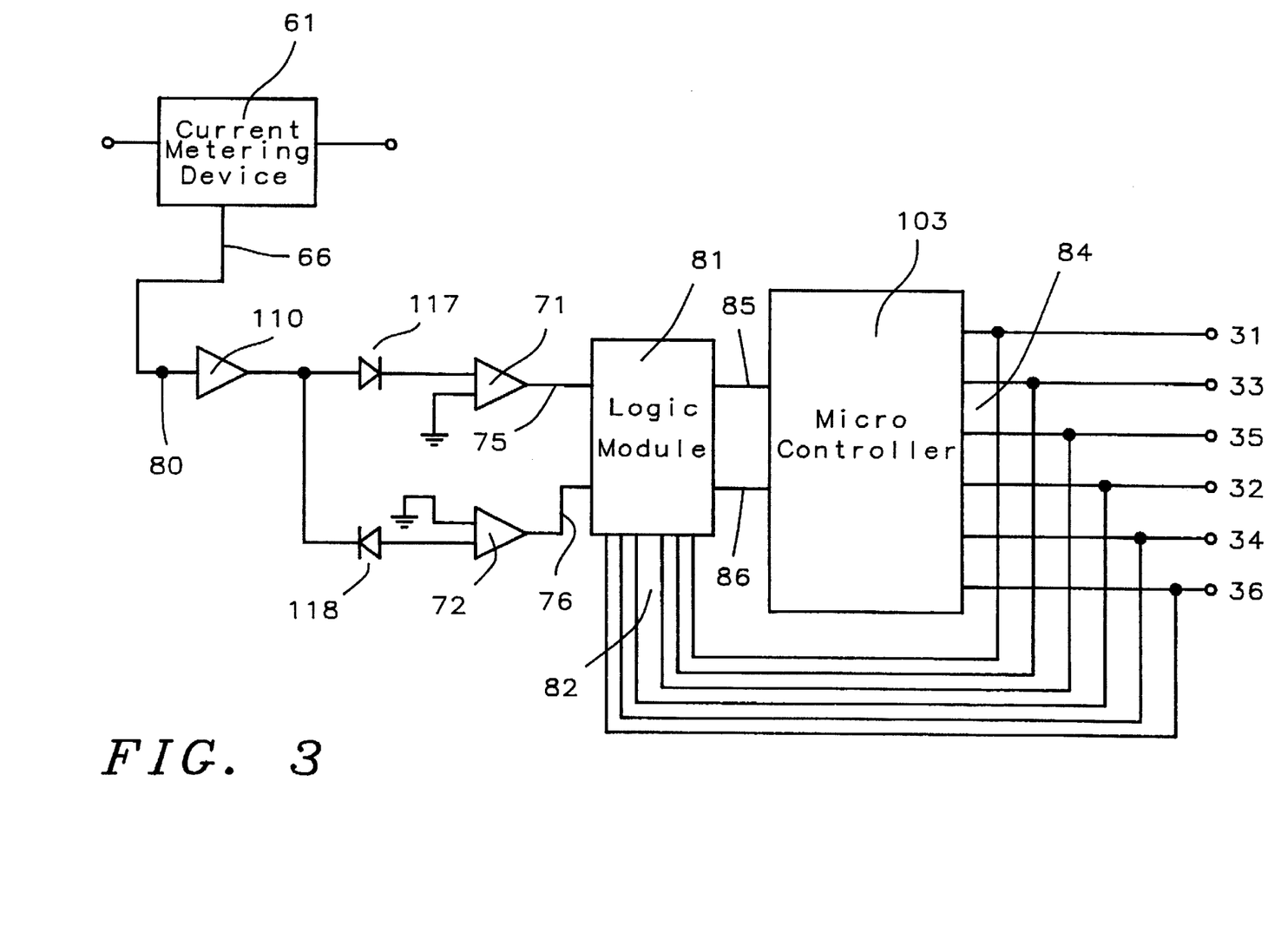
FIG. 3 shows a block diagram of the inverter feedback mechanism for the inverter output bridge circuit.
Figure 7A:
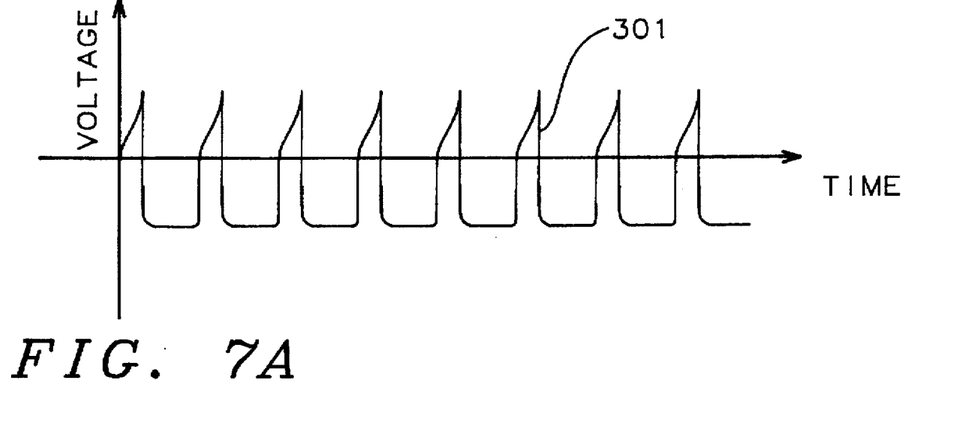
FIG. 7A shows an actual trace of the DCCT output voltage when the induction motor is motoring.
Figure 8A:
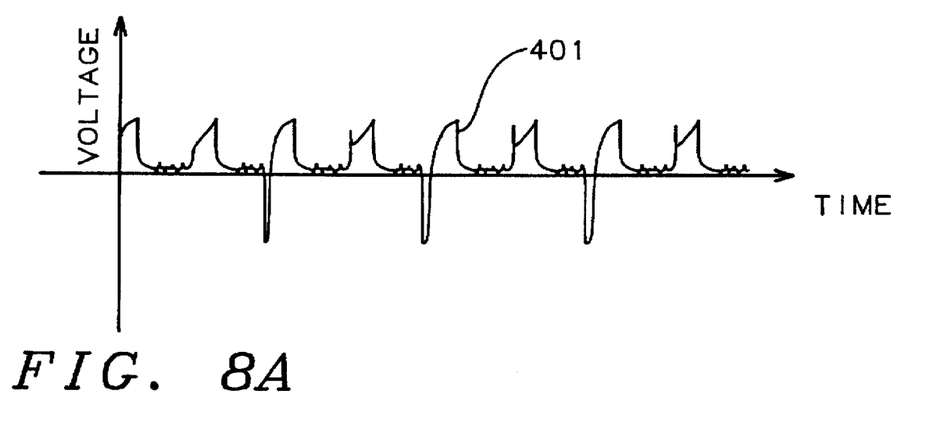
FIG. 8A shows an actual trace of the DCCT output voltage when the induction motor is regenerating.

Refer now to FIG. 3, FIG. 7A, and FIG. 8A. FIG. 7A shows the trace 301 of the output, 66 in FIG. 3, of the DCCT, 61 in FIG. 3, when placed on the positive DC link and the induction motor is motoring, that is the motor is working to overcome friction in the motor and load, or to increase the speed of rotation of the motor and load. FIG. 8A shows the trace 401 of the output of the DCCT when placed on the positive DC link and the induction motor is regenerating, that is the motor load is feeding power back to the induction motor.

Figure 7B:
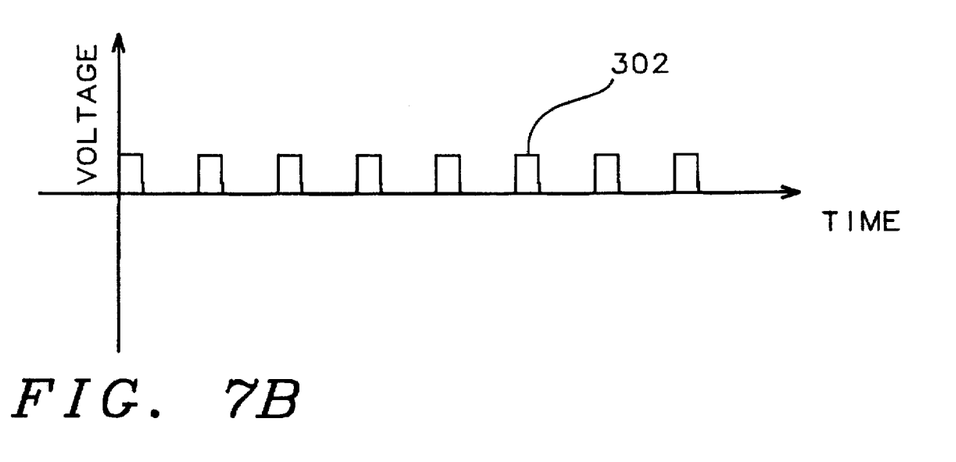
FIG. 7B shows an actual trace of the voltage at the first output terminal, $V_{regen}$, of the logic module when the induction motor is motoring.
Figure 7C:
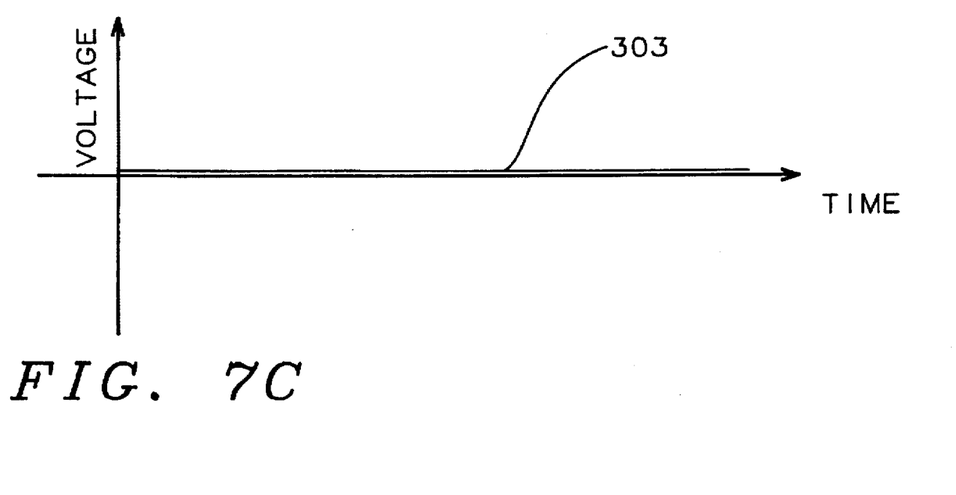
FIG. 7C shows an actual trace of the voltage at the second output terminal, $V_{motor}$, of the logic module when the induction motor is motoring.
Figure 8B:
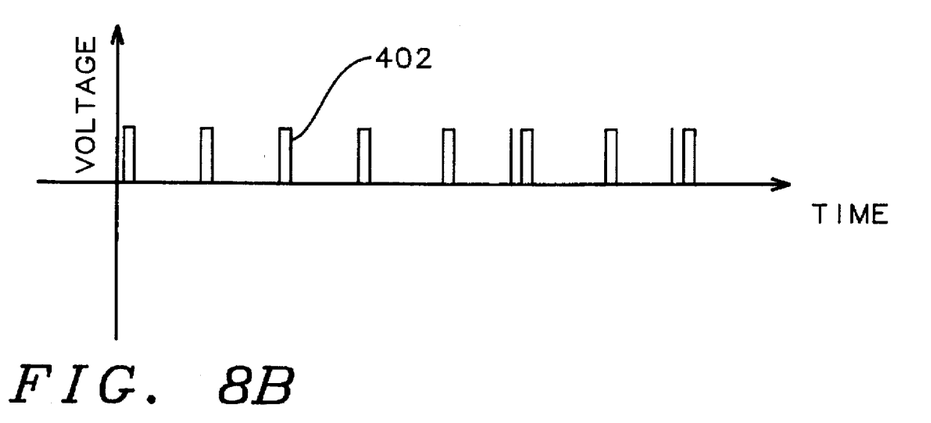
FIG. 8B shows an actual trace of the voltage at the first output terminal, $V_{regen}$, of the logic module when the induction motor is regenerating.
Figure 8C:
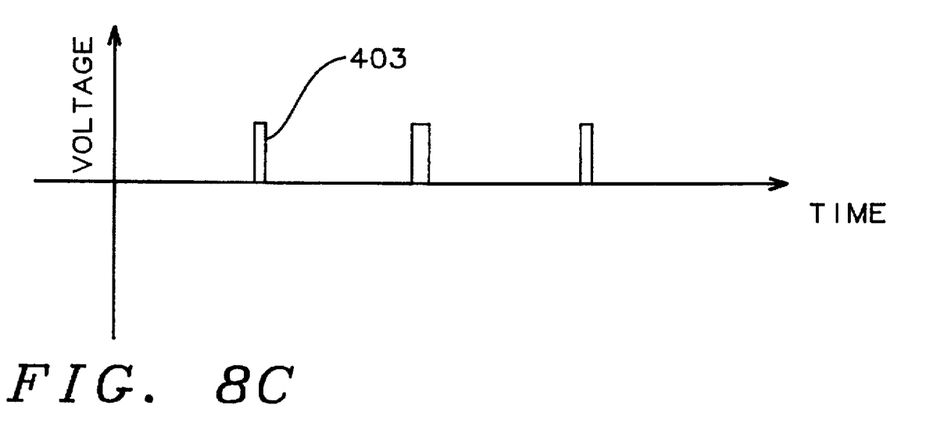
FIG. 8C shows an actual trace of the voltage at the second output terminal, $V_{motor}$, of the logic module when the induction motor is regenerating.

Referring again to FIG. 3, the output 66 of the DCCT 61 is fed to a negative threshold comparitor 118 and 72 to produce the logic signal $I_n$ 76. $I_n$ is fed to the logic module 81 to gate the signal only when the current in the positive DC link or the negative DC link is negative to produce a voltage, $V_{regen}$, 86. $V_{regen}$ can be used to enable a timer causing it to count when the motor is regenerating. A trace 303 of this voltage when the motor is motoring is shown in FIG. 7C. A trace 403 of this voltage when the motor is regenerating is shown in FIG. 8C. The output of the DCCT 61 is fed to a positive threshold comparator 117 and 71 to produce the logic signal $I_p$ 75. $I_p$ is fed to the logic module 81 to gate the signal only when the current in the positive DC link and the negative DC link is positive to produce a voltage, $V_{motor}$, 85. $V_{motor}$ can be used to enable a timer causing it to count when the motor is motoring. The motor is motoring is shown in FIG. 7B. A trace 402 of this voltage when the motor is regenerating is shown in FIG. 8B.

The voltage, $V_{motor}$, is applied to the enable output of a timer and the timer is read at the end of every pulse width modulation, PWM, period, or some integral multiple of PMW periods, then reset. The value read represents the time, $T_{motor}$, power was flowing into the motor. Likewise the voltage, $V_{regen}$, is applied to the enable output of a timer and the timer is read at the end of every pulse width modulation, PWM, period, or some integral multiple of PMW periods, then reset. The value read represents the time, $T_{regen}$, power was flowing out of the motor.

A controller can then use these values to control the magnitude and phase of the PMW generated three phase AC applied to the motor so as to improve its rotational stability. The following equation describes how $T_{motor}$ and $T_{regen}$ can be used to control the phase of the AC sine wave applied to the motor.

Stability Phase Angle = $K1$ * Rate Of Change $(T_{motor})$ +

$K2$ * $T_{motor}$ + $K3$ * Weighted Average $(T_{motor})$ +

$K4$ * Rate Of Change $(T_{regen})$ + $K5$ * $T_{regen}$ +

$K6$ * Weighted Average $(T_{regen})$.

In the preceding equation:

Phase Angle=the angle of the output AC sine wave;

Rate Of Change ($T_{motor}$)=some rate of change of $T_{motor}$ over two or more readings;

Rate Of Change ($T_{regen}$)=some rate of change of $T_{regen}$ over two or more readings;

Weighted Average ($T_{motor}$)=some weighted average value of $T_{motor}$ over two or more readings;

Weighted Average ($T_{regen}$)=some weighted average value of $T_{regen}$ over two or more readings; and K1, K2, K3, K4, K5, and K6 are constants.

A controller uses values to minimize the power delivered to the motor by minimizing the effective applied voltage. The following equation describes how $T_{motor}$ and $T_{regen}$ can be used to control the magnitude of the AC sine wave applied to the motor.

$$\text{Voltage Delta} = K7 * \text{Rate Of Change } (T_{motor}) + K8 * T_{motor} +$$
$$K9 * \text{Weighted Average } (T_{motor}) + K10 * \text{Rate Of Change}$$
$$(T_{regen}) + K11 * T_{regen} + K12 * \text{Weighted Average } (T_{regen}).$$

Voltage=Voltage+Voltage Delta.

In the preceding equation:

Voltage is the magnitude of the output AC sine wave;

Rate Of Change ($T_{motor}$)=some rate of change of $T_{motor}$ over two or more readings;

Rate Of Change ($T_{regen}$)=some rate of change of $T_{regen}$ over two or more readings;

Weighted Average ($T_{motor}$)=some weighted average value of $T_{motor}$ over two or more readings;

Weighted Average ($T_{regen}$)=some weighted average value of $T_{regen}$ over two or more readings; and K7, K8, K9, K10, K11, and K12 are constants.

Figure 4:
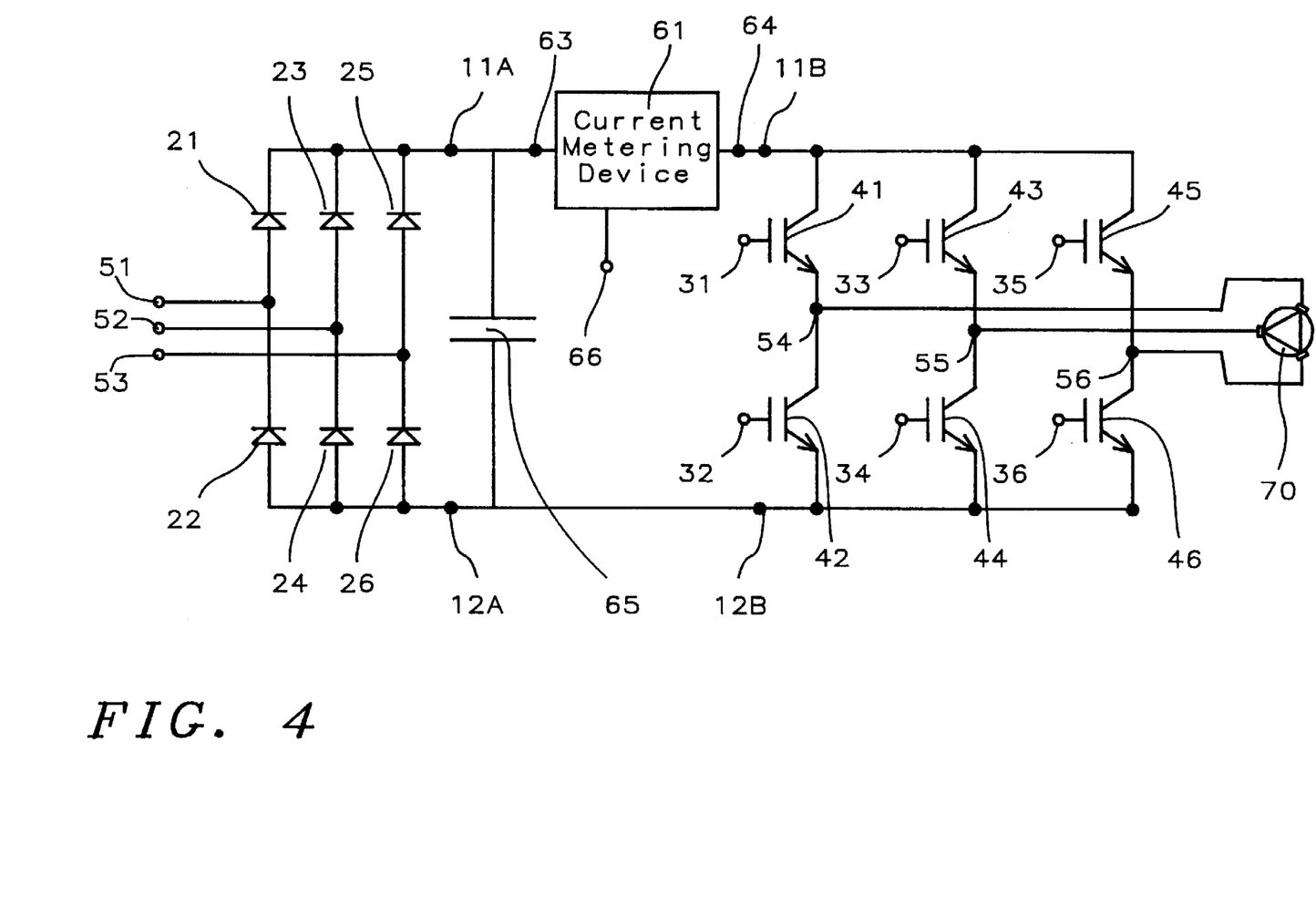
FIG. 4 is a schematic diagram of the DC power source feeding the inverter output bridge circuit, which in turn feeds a three phase induction motor, showing the location of the Direct Current Current Transformer.

Refer now to FIG. 4, there is shown a preferred embodiment of the inverter feedback mechanism. FIG. 4 shows a diagram of a direct current, or DC, source feeding an inverter bridge circuit which delivers three phase alternating current, or AC power to a three phase induction motor 70. The DC source comprises an AC three phase source, not shown, connected to three input terminals 51, 52, and 53 which are connected to a rectifier bridge circuit. The first input terminal 51 is connected to the anode of a first diode 21 and to the cathode of a fourth diode 22. The second input terminal 52 is connected to the anode of a second diode 23 and to the cathode of a fifth diode 24. The third input terminal 53 is connected to the anode of a third diode 25 and to the cathode of a sixth diode 26. The cathodes of the first 21, second 23, and third 25 diodes are connected to the positive terminal 11A of the DC power source. The anodes of the fourth 22, fifth 24, and sixth 26 diodes are connected to the negative terminal 12A of the DC power source. A capacitor 65 is connected to the positive terminal 11A and the negative terminal 12 of the DC power source to provide smoothing of the DC output power.

The DC source is connected to a feedback controlled inverter bridge circuit using six insulated gate bipolar transistors, IGBTs. Each IGBT has a collector, an emitter, and a gate. A positive voltage drop from the insulated gate to the emitter allows current to flow between the collector and the emitter. A zero or negative voltage drop from the insulated gate to the emitter does not allow current flow between the collector and emitter.

The current input terminal 63 of a Direct Current Current Transformer, DCCT, 61 is connected to the positive terminal 11A of the DC power source. The current output terminal 64 of the DCCT 61 is connected to the positive terminal 11B of the inverter bridge circuit. The negative terminal 12B of the inverter bridge circuit is connected to the negative terminal 12A of the DC power source. The DCCT 61 measures the DC current into the positive terminal 11B of the inverter bridge circuit and produces a feedback voltage at the feedback signal output terminal 66 of the DCCT 61 which is proportional to the current into the positive terminal 11B of the inverter bridge circuit. The feedback voltage will be positive for currents flowing into the positive terminal 11B of the inverter bridge circuit and negative for currents flowing out of the positive terminal 11B of the inverter bridge circuit. The feedback voltage will be used to control the inverter bridge circuit operation.

The positive terminal 11B of the inverter bridge circuit is connected to the collectors of the first insulated gate bipolar transistor 41, the second insulated gate bipolar transistor 43, and the third insulated gate bipolar transistor 45. The negative terminal 14 of the inverter bridge circuit is connected to the emitters of the fourth insulated gate bipolar transistor 42, the fifth insulated gate bipolar transistor 44, and the sixth insulated gate bipolar transistor 46. The emitter of the first insulated gate bipolar transistor 41 is connected to the collector of the fourth insulated gate bipolar transistor 42 and to the first output terminal 54 of the inverter bridge circuit. The emitter of the second insulated gate bipolar transistor 43 is connected to the collector of the fifth insulated gate bipolar transistor 44 and to the second output terminal 55 of the inverter bridge circuit. The emitter of the third insulated gate bipolar transistor 45 is connected to the collector of the sixth insulated gate bipolar transistor 46 and to the third output terminal 56 of the inverter bridge circuit. The first 54, second 55, and third 56 output terminals of the inverter bridge circuit are connected to a three phase induction motor 70. The feedback voltage at the feedback signal terminal 66 of the DC monitor circuit is used to monitor the state of the induction motor 70, to stabilize the rotational speed of the motor, and to minimize the power delivered to the motor.

Figure 5A:
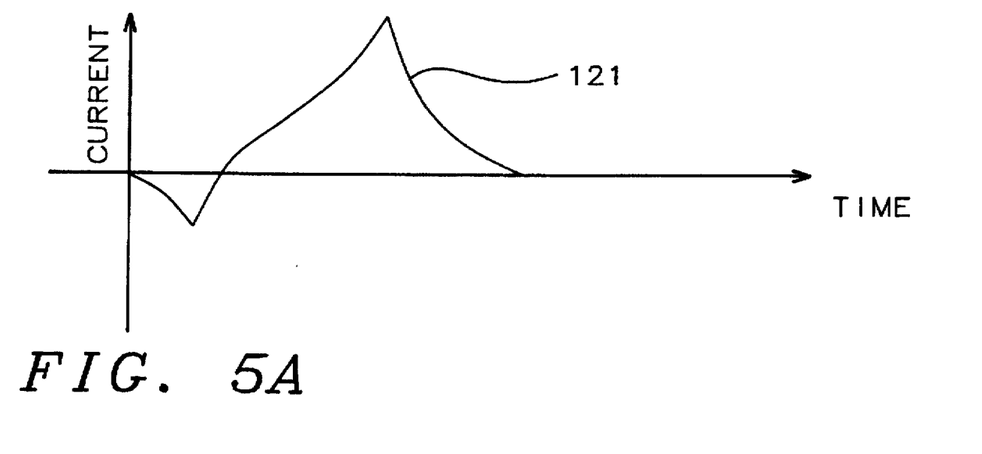
FIG. 5A shows the current into the inverter bridge circuit as a function of time for normal operation of the three phase induction motor.
Figure 5B:
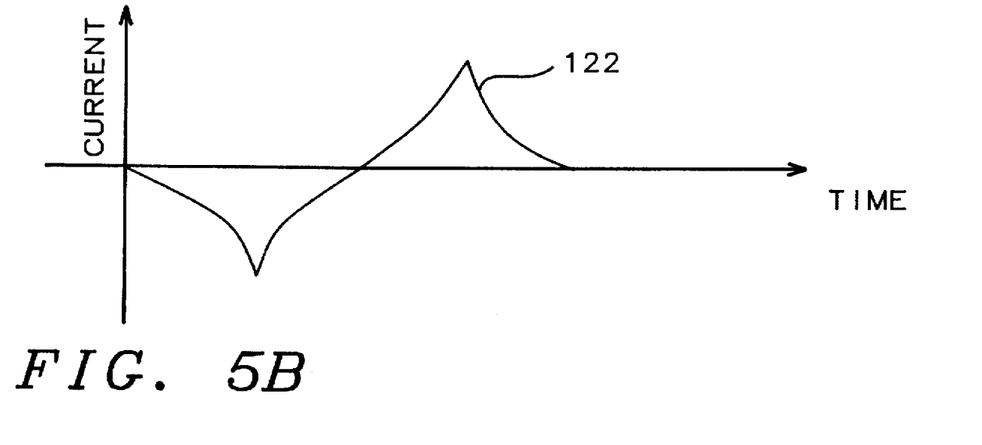
FIG. 5B shows the current into the inverter bridge circuit as a function of time for the three phase induction motor operating as a generator over too much of the operating cycle.
Figure 5C:
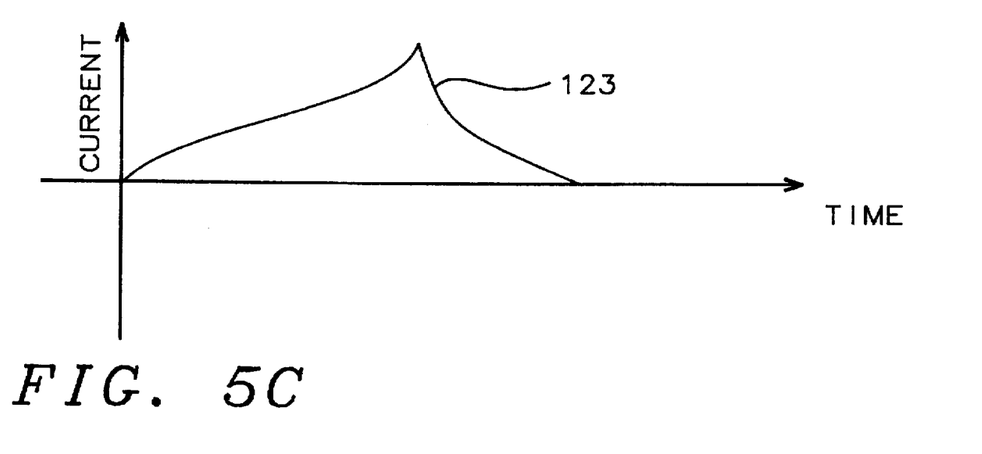
FIG. 5C shows the current into the inverter bridge circuit as a function of time for the three phase induction motor operating as a motor over all of the operating cycle.

Refer now to FIG. 5A, FIG. 5B, and FIG. 5C, there is shown the current as a function of time characteristics of the current flowing into the positive terminal of the inverter bridge circuit for various conditions of the induction motor. A positive current indicates the induction motor is drawing power from the inverter bridge circuit and acting as a motor. A negative current indicates the induction motor is feeding power back into the inverter bridge circuit and is acting as a generator. The current vs time characteristic 121 in FIG. 5A represents normal operation for the induction motor. The current vs time characteristic 122 in FIG. 5B represents increased generator operation, compared to the characeistic shown in FIG. 5A. The current vs time characteristic 123 in FIG. 5C represents motor operation over the entire operating cycle.

FIG. 3 shows a diagram of the current comparitor circuit used to process the feedback voltage produced by the DCCT and comprises a first Schottky diode 117, a second Schottky diode 118, a positive threshold comparitor 71, a negative threshold comparitor 72, and a logic module 81. The anode of the first Schottky diode 117 is connected to the first input of the positive threshold comparator 71. The second input of the positive threshold comparator 71 is connected to ground. The anode of the second Schottky diode 118 is connected to the second input of the negative threshold comparator 72. The first input of the second threshold comparator 72 is connected to ground. The feedback voltage produced in the DCCT is connected to the anode of the first Schottky diode 117 and the cathode of the second Schottky diode 118 at the input 80 of the current comparitor circuit. The anode of the first Schottky diode 117 is connected to the positive threshold comparitor 71. The cathode of the second Schottky diode 118 is connected to the negative threshold comparitor 72. When the current into the positive terminal of the inverter bridge circuit, reference number 11B in FIG. 4, is positive, the feedback voltage at the input terminal 80 of the current comparitor is positive, the output 75 of the positive threshold comparitor 71 is positive, and the output 76 of the negative threshold comparitor 72 is about zero. When the current into the positive terminal of the inverter bridge circuit, reference number 11B in FIG. 4, is negative, the feedback voltage at the input terminal 80 of the current comparitor is negative, the output 76 of the negative threshold comparitor 72 is positive, and the output 75 of the positive threshold comparitor 71 is about zero.

Figure 6A:
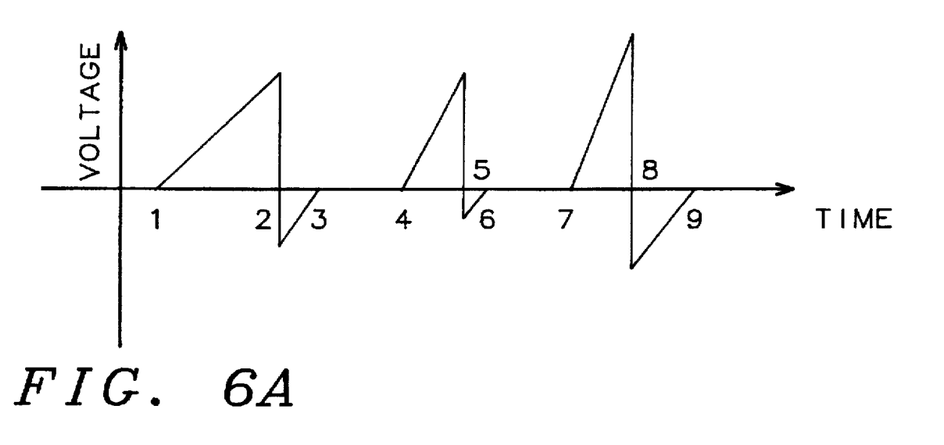
FIG. 6A shows the voltage input to the comparitor circuit as a function of time for a typical operating condition.
Figure 6B:
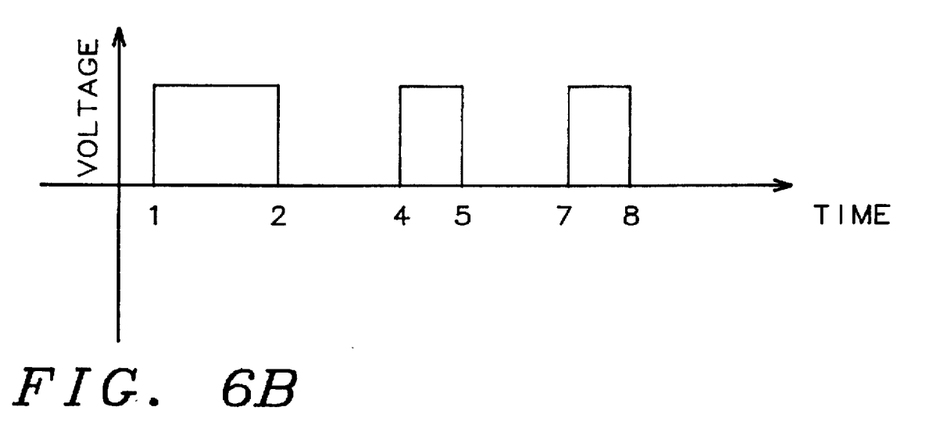
FIG. 6B shows the voltage output of the positive threshold comparitor as a function of time for the input voltage shown in FIG. 6A.
Figure 6C:
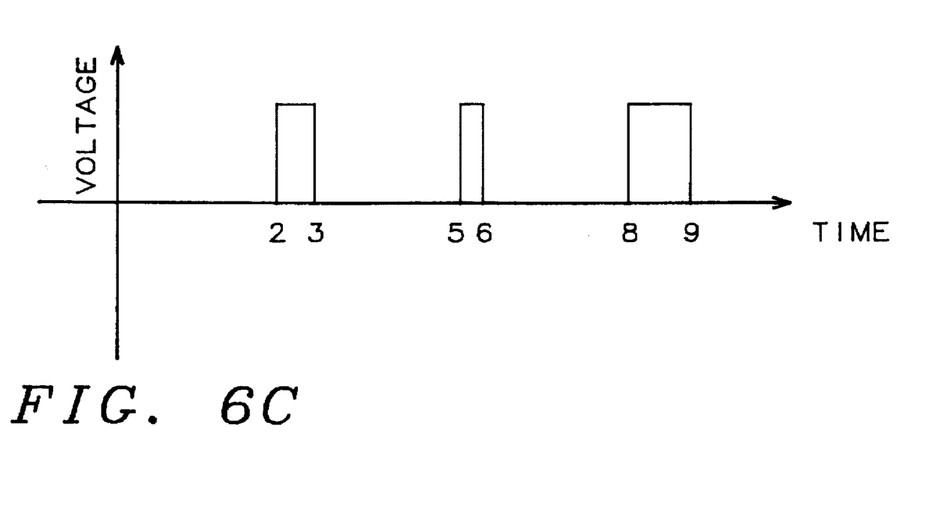
FIG. 6C shows the voltage output of the negative threshold comparitor as a function of time for the input voltage shown in FIG. 6A.

FIG. 6A shows a curve of a feedback voltage at the feedback voltage terminal 66 of the DCCT 61 as a function of time corresponding to a period of positive current into the positive terminal of the inverter bridge circuit followed by a period of negative current into the positive terminal of the inverter bridge circuit. As shown in FIG. 6A there are zero current periods. FIG. 6B shows the resulting voltage at the output 75 of the positive threshold comparitor 71. FIG. 6C shows the resulting voltage at the output 76 of the negative threshold comparitor 72.

Returning to FIG. 3 the output of the positive threshold comparitor and the output of the negative threshold comparitor are connected to a logic stage of the logic module 81 which also has control inputs connected to a control bus 82. The logic module control bus 82 is connected to the inverter output bridge control bus, not shown in FIG. 3. The logic stage then gates the output of the positive threshold comparitor and the output of the negative threshold comparitor with some Boolean Logic of the inverter output bridge control signals to improve the relationship of the feedback with the motor state. The logic stage produces a re-formatted $I_p$ at the first output 85 and a re-formatted $I_n$ at the second output 86 of the logic module 81. The re-formatted $I_p$ and $I_n$ also have logic levels which indicate whether the current in the positive DC link and the negative DC link are positive or negative. The first output 85 and the second output 86 of the logic module are then fed to the count enable inputs of a first timer and a second timer of a micro-controller 103. The micro-controller 103 has control outputs 31, 32, 33, 34, 35, and 36 which are connected to a micro-controller control bus 84, to the logic module control bus 82, and to the gates of the six IGBTs in the inverter output bridge. The micro-controller control outputs are the control signals to the inverter output bridge and vary the phase, magnitude, and/or frequency of the three phase AC power delivered to the three phase induction motor 70.

The inputs to the gates of the insulated gate bipolar transistors minimize the power the inverter bridge circuit delivers to the induction motor 70 and provides speed stability for induction motor. This inverter feedback mechanism is able to minimize the power delivered to the induction motor and provide speed stability to the induction motor using feedback of only the current monitored by the DCCT 61 and processed by the logic module 81 and the micro-controller 103.

While the invention has been particularly shown and described with reference to the preferred embodiments thereof, it will be understood by those skilled in the art that various changes in form and details may be made without departing from the spirit and scope of the invention.

What is claimed is:

1. An inverter feedback mechanism, comprising:
   a direct current power source having a positive output terminal and a negative output terminal;
   an inverter output bridge for converting direct current power input to alternating current power output having a positive power input terminal, a negative power input terminal, a plurality of control input terminals, a plurality of alternating current power output terminals, and an induction motor connected to said alternating current power output terminals wherein the signals at said control input terminals control the alternating current power delivered by said inverter output bridge to said induction motor;
   a positive direct current link connected between said positive output terminal of said direct current power source and said positive power input terminal of said inverter output bridge wherein the current in said positive direct current link is positive when flowing into said positive power input terminal of said inverter output bridge and negative when flowing out of said positive power input terminal of said inverter output bridge;
   a negative direct current link connected between said negative output terminal of said direct current power source and said negative power input terminal of said inverter output bridge wherein the current in said negative direct current link is positive when flowing out of said negative power input terminal of said inverter output bridge and negative when flowing into said negative direct current input terminal of said inverter output bridge;
   means for generating a first logic signal wherein said first logic signal has a first logic value when the current in said negative direct current link is positive and a second logic value when the current in said negative direct current link is not positive;
   means for generating a second logic signal wherein said second logic signal has said first logic value when the current in said negative direct current link is negative and said second logic value when the current in said negative direct current link is not negative;
   means for combining said first logic signal and said second logic signal to generate a number of control signals wherein each of said control signals depends on the amount of time said current in said negative direct current link is positive and the amount of time said current in said negative direct current link is negative;
   electrical connections between each of said control signals and one of said control input terminals of said inverter output bridge; and
   a number of switching elements wherein each said switching element has a connection to one of said control input terminals and a connection to one of said alternating current power output terminals.

2. The inverter feedback mechanism of claim 1 wherein said alternating current power delivered by said inverter output bridge to said alternating current power output terminals is three phase alternating current power.

3. The inverter feedback mechanism of claim 2 wherein said induction motor is a three phase induction motor.

4. The inverter feedback mechanism of claim 1 wherein said alternating current power delivered by said inverter output bridge to said alternating current power output terminals is two phase alternating current power.

5. The inverter feedback mechanism of claim 4 wherein said induction motor is a two phase induction motor.

6. The inverter feedback mechanism of claim 1 wherein said means for generating said first logic signal and said second logic signal further comprises:
   a current metering circuit having an output terminal wherein the voltage at said output terminal is proportional to the current in said positive direct current link or the current in said negative direct current link;
   a current sign detector circuit having an input, a first output terminal, and a second output terminal wherein the signal at the first output terminal is said first logic signal and the signal at said second output terminal is said second logic signal.

7. The inverter feedback mechanism of claim 1 wherein said means for combining said first logic signal and said second logic signal comprises a logic module and a micro-controller.

8. The inverter feedback mechanism of claim 1 wherein said means for combining said first logic signal and said second logic signal to generate a number of control signals comprises a logic module and a micro-controller.

9. The inverter feedback mechanism of claim 1 wherein controlling the speed of said induction motor comprises said switching elements.

10. The inverter feedback mechanism of claim 1 wherein control of the power delivered to said induction motor by said inverter output bridge comprises said switching elements.

11. The inverter feedback mechanism of claim 1 wherein said switching elements are insulated gate bipolar transistors.

12. The inverter feedback mechanism of claim 1 wherein said switching elements are insulated gate bipolar transistors.

13. A three phase inverter feedback mechanism, comprising:
   a direct current power source having a positive output terminal and a negative output terminal;
   an inverter output bridge wherein direct current input power is converted to variable three phase alternating current output power comprised of a first insulated gate bipolar transistor having a gate, a collector and an emitter; a second insulated gate bipolar transistor having a gate, a collector and an emitter; a third insulated gate bipolar transistor having a gate, a collector and an emitter; a fourth insulated gate bipolar transistor having a gate, a collector and an emitter; a fifth insulated gate bipolar transistor having a gate, a collector and an emitter; a sixth insulated gate bipolar transistor having a gate, a collector and an emitter; a positive power input terminal; a negative power input terminal; a first three phase alternating current output terminal; a second three phase alternating current output terminal; and a third three phase alternating output terminal wherein said collector of said first insulated gate bipolar transistor, said collector of said second insulated gate bipolar transistor, and said collector of said third insulated gate bipolar transistor are connected to said positive power input terminal; said emitter of said fourth insulated gate bipolar transistor, said emitter of said fifth insulated gate bipolar transistor, and said emitter of said sixth insulated gate bipolar transistor are connected to said negative power input terminal; said emitter of said first insulated gate bipolar transistor is connected to said collector of said fourth insulated gate bipolar transistor and to said first three phase alternating current output terminal; said emitter of said second insulated gate bipolar transistor is connected to said collector of said fifth insulated gate bipolar transistor and to said second three phase alternating current output terminal; and said emitter of said third insulated gate bipolar transistor is connected to said collector of said sixth insulated gate bipolar transistor and to said third three phase alternating current output terminal;
   a three phase induction motor connected to said first three phase alternating current output terminal, said second three phase alternating current output terminal, and said third three phase alternating current output terminal;
   a positive direct current link connected between said positive output terminal of said direct current power source and said positive power input terminal of said inverter output bridge wherein the current in said positive direct current link is positive when flowing into said positive power input terminal of said inverter output bridge and negative when flowing out of said positive power input terminal of said inverter output bridge;
   a negative direct current link connected between said negative output terminal of said direct current power source and said negative power input terminal of said inverter output bridge wherein the current in said negative direct current link is positive when flowing out of said negative power input terminal of said inverter output bridge and negative when flowing into said negative direct current input terminal of said inverter output bridge;
   means for generating a first logic signal wherein said first logic signal has a first logic value when the current in said negative direct current link is positive and a second logic value when the current in said negative direct current link is not positive;
   means for generating a second logic signal wherein said second logic signal has said first logic value when the current in said negative direct current link is negative and said second logic value when the current in said negative direct current link is not negative;
   means for combining said first logic signal and said second logic signal to generate a first control signal, a second control signal, a third control signal, a fourth control signal, a fifth control signal, and a sixth control signal wherein each of said first, second, third, fourth, fifth and sixth control signals depends on the amount of time said current in said negative direct current link is positive and the amount of time said current in said negative direct current link is negative; and
   electrical connections between said first control signal and said gate of said first insulated gate bipolar transistor, said second control signal and said gate of said second insulated gate bipolar transistor, said third control signal and said gate of said third insulated gate bipolar transistor, said fourth control signal and said gate of said fourth insulated gate bipolar transistor, said fifth control signal and said gate of said fifth insulated gate bipolar transistor, and said sixth control signal and said gate of said sixth insulated gate bipolar transistor.

14. The three phase inverter feedback mechanism of claim 13 wherein control of the speed of said three phase induction motor comprises pulse width modulation.

15. The three phase inverter feedback mechanism of claim 13 wherein control of the power delivered to said three phase induction motor by said inverter output bridge comprises pulse width modulation.

16. The three phase inverter feedback mechanism of claim 13 wherein said means for generating said first logic signal and said second logic signal further comprises:

a current metering circuit having an output terminal wherein the voltage at said output terminal is proportional to the current in said positive direct current link or the current in said negative direct current link; and a current sign detector circuit having an input, a first output terminal, and a second output terminal wherein the signal at the first output terminal is said first logic signal and the signal at said second output terminal is said second logic signal.

17. The three phase inverter feedback mechanism of claim 13 wherein said means for combining said first logic signal and said second logic signal to generate a first control signal, a second control signal, a third control signal, a fourth control signal, a fifth control signal, and a sixth control signal comprises a logic module and a micro-controller.

* * * * *